United States Patent
Goswami

(10) Patent No.: US 11,860,840 B2
(45) Date of Patent: Jan. 2, 2024

(54) UPDATE OF DEDUPLICATION FINGERPRINT INDEX IN A CACHE MEMORY

(71) Applicant: Hewlett Packard Enterprise Development LP, Spring, TX (US)

(72) Inventor: Sudhanshu Goswami, Durham, NC (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 0 days.

(21) Appl. No.: 18/151,522

(22) Filed: Jan. 9, 2023

(65) Prior Publication Data

US 2023/0195702 A1    Jun. 22, 2023

Related U.S. Application Data

(63) Continuation of application No. 17/065,192, filed on Oct. 7, 2020, now Pat. No. 11,593,328.

(51) Int. Cl.
| | | |
|---|---|---|
| *G06F 16/215* | (2019.01) | |
| *G06F 16/22* | (2019.01) | |
| *G06F 12/02* | (2006.01) | |
| *G06F 12/0864* | (2016.01) | |
| *G06F 11/14* | (2006.01) | |

(52) U.S. Cl.
CPC ........ *G06F 16/215* (2019.01); *G06F 11/1469* (2013.01); *G06F 12/0246* (2013.01); *G06F 12/0253* (2013.01); *G06F 12/0864* (2013.01); *G06F 16/2246* (2019.01); *G06F 2201/80* (2013.01)

(58) Field of Classification Search
CPC .............. G06F 16/215; G06F 16/2246; G06F 12/0253; G06F 12/0864; G06F 12/0246; G06F 11/1469
USPC ....................................................... 707/692
See application file for complete search history.

(56) References Cited

U.S. PATENT DOCUMENTS

| | | |
|---|---|---|
| 9,436,392 B1 | 9/2016 | Shetty et al. |
| 9,910,784 B2 | 3/2018 | Maheshwari |
| 9,977,746 B2 | 5/2018 | Muppalaneni et al. |

(Continued)

FOREIGN PATENT DOCUMENTS

| | | |
|---|---|---|
| CN | 109416681 A | 3/2019 |
| CN | 109977111 A | 7/2019 |

OTHER PUBLICATIONS

Dubeyko, V., "SSDFS: Towards LFS Flash-Friendly File System without GC operations", Jul. 27, 2019, pp. 52.

(Continued)

*Primary Examiner* — Alexandria Y Bromell
(74) *Attorney, Agent, or Firm* — Trop, Pruner & Hu, P.C.

(57) ABSTRACT

In some examples, a system performs data deduplication using a deduplication fingerprint index in a hash data structure comprising a plurality of blocks, wherein a block of the plurality of blocks comprises fingerprints computed based on content of respective data values. The system merges, in a merge operation, updates for the deduplication fingerprint index to the hash data structure stored in a persistent storage. As part of the merge operation, the system mirrors the updates to a cached copy of the hash data structure in a cache memory, and updates, in an indirect block, information regarding locations of blocks in the cached copy of the hash data structure.

20 Claims, 7 Drawing Sheets

(56) References Cited

U.S. PATENT DOCUMENTS

| | | |
|---|---|---|
| 10,169,365 B2 | 1/2019 | Maheshwari |
| 10,175,894 B1 | 1/2019 | Visvanathan et al. |
| 10,331,561 B1 | 6/2019 | Shilane et al. |
| 10,380,073 B2 | 8/2019 | Kuo |
| 10,503,717 B1 | 12/2019 | Visvanathan et al. |
| 10,671,501 B2 | 6/2020 | Taylor et al. |
| 10,776,276 B2 | 9/2020 | Shergill et al. |
| 11,030,107 B2 | 6/2021 | Shergill et al. |
| 11,226,904 B2 | 1/2022 | Vanninen et al. |
| 11,307,788 B2 | 4/2022 | Goswami et al. |
| 11,354,289 B2 | 6/2022 | Goswami et al. |
| 11,403,020 B2 | 8/2022 | Goswami et al. |
| 2015/0127621 A1 | 5/2015 | Kuo |
| 2016/0070726 A1 | 3/2016 | MacNicol et al. |
| 2016/0283920 A1* | 9/2016 | Fisher ............... G06Q 20/065 707/707 |
| 2017/0115883 A1 | 4/2017 | Muppalaneni et al. |
| 2017/0192864 A1 | 7/2017 | Taylor et al. |
| 2017/0255643 A1 | 9/2017 | Maheshwari |
| 2018/0060367 A1 | 3/2018 | Ioannou et al. |
| 2018/0253255 A1 | 9/2018 | Jain et al. |
| 2019/0034427 A1 | 1/2019 | Trika et al. |
| 2019/0179813 A1 | 6/2019 | Macnicol et al. |
| 2020/0133800 A1 | 4/2020 | Varadan et al. |
| 2021/0133177 A1 | 5/2021 | Goswami et al. |

OTHER PUBLICATIONS

Goswami et al., U.S. Appl. No. 16/669,930 entitled Merging Buffered Fingerprint Index Entries filed Oct. 31, 2019, pp. 83.

Goswami et al., U.S. Appl. No. 16/669,941 entitled Increasing Sizes of Buckets of a Fingerprint Index filed Oct. 31, 2019 (82 pages).

Goswami et al., U.S. Appl. No. 16/669,955 entitled Sampling Fingerprints in Bins filed Oct. 31, 2019 (81 pages).

Goswami et al., U.S. Appl. No. 16/669,993 entitled Indirect Block Containing References to Blocks of a Persistent Fingerprint Index filed Oct. 31, 2019 (82 pages).

Oracle, "Exadata Smart Flash Cache Features and the Oracle Exadata Database Machine", Dec. 2013, pp. 15.

* cited by examiner

UPDATE OF DEDUPLICATION FINGERPRINT INDEX IN A CACHE MEMORY

CROSS REFERENCE TO RELATED APPLICATION

This is a continuation of U.S. application Ser. No. 17/065,192, filed Oct. 7, 2020, the content of which is hereby incorporated by reference.

BACKGROUND

Data reduction techniques can be applied to reduce the amount of data stored in a storage system. An example data reduction technique includes data deduplication. Data deduplication identifies data values that are duplicative, and seeks to reduce or eliminate the number of instances of duplicative data values that are stored in the storage system.

BRIEF DESCRIPTION OF THE DRAWINGS

Some implementations of the present disclosure are described with respect to the following figures.

Figure 1:
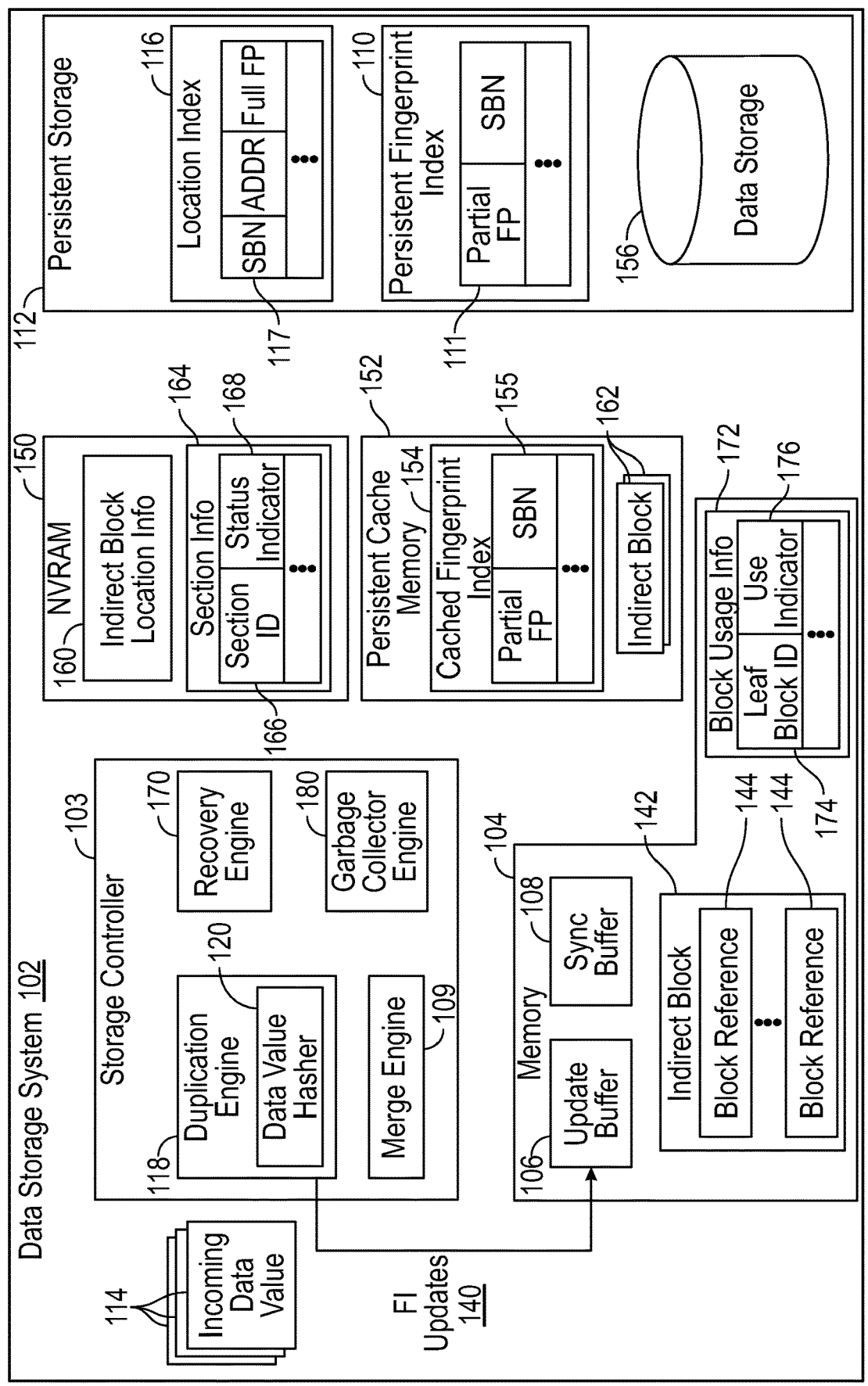
FIG. 1 is a block diagram of a data storage system that includes a persistent fingerprint index and a cached fingerprint index, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In some examples, data deduplication is accomplished by computing a fingerprint of an incoming data value that is to be stored (written) into a data storage system. A "data storage system" can include a storage device or a collection of storage devices. A data storage system can include a data storage array, a data storage appliance, and so forth.

A data storage system may also include storage controller(s) that manage(s) access of the storage device(s). A "data value" can refer to any portion of data that can be separately identified in the data storage system. In some cases, a data value can refer to a chunk, a collection of chunks, or any other portion of data.

A "controller" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, a "controller" can refer to a combination of a hardware processing circuit and machine-readable instructions (software and/or firmware) executable on the hardware processing circuit.

A "fingerprint" refers to a value derived by applying a function on the content of a data value (where the "content" can include the entirety or a subset of the content of the data value). An example of the function that can be applied includes a hash function that produces a hash value based on the incoming data value. Examples of hash functions include cryptographic hash functions such as the Secure Hash Algorithm 2 (SHA-2) hash functions, e.g., SHA-224, SHA-256, SHA-384, etc. In other examples, other types of hash functions or other types of fingerprint functions may be employed.

Fingerprints represent data values stored in the data storage system. Full fingerprints uniquely identify respective data values (the difference between full fingerprints and partial fingerprints is discussed further below). A fingerprint computed for an incoming data value can be compared to fingerprints stored in a fingerprint index, which is used for data deduplication. The fingerprint index maps fingerprints for data values to storage location indicators of the data values. A "storage location indicator" can refer to any information that provides an indication of a storage location of a data values in a persistent storage. The persistent storage can be implemented using one or multiple persistent (e.g., nonvolatile) storage device(s), such as disk-based storage device(s) (e.g., hard disk drive(s) (HDDs)), solid state device(s) (SSDs) such as flash storage device(s), or the like, or a combination thereof.

In some examples, the fingerprint index maps fingerprints to sequential block numbers (SBNs). An SBN is an example of a storage location indicator referred to above. An SBN is useable to determine where a data value is physically stored in a persistent storage. However, in some examples, the SBN does not actually identify the physical location, but rather, the SBN can be used to derive a physical address or other value that identifies a physical location.

During a data deduplication operation performed for an incoming data value, a match between a fingerprint of the incoming data value with a fingerprint in the fingerprint index indicates that the incoming data value may be a duplicate of a data value already stored in the data storage system. If the incoming data value is a duplicate of an already stored data value, instead of storing the duplicative incoming data value, a reference count stored in the data storage system can be incremented to indicate the number of instances of the data value that have been received.

As the data storage system fills up with data values, the size of the fingerprint index stored in the persistent storage increases. Keeping a large fingerprint index up to date can be costly in terms of resource usage.

A data storage system can include a number of different types of storage for storing data, including a persistent storage, a non-volatile random access memory (NVRAM), and a volatile memory.

A persistent storage can be implemented using relatively low cost storage device(s), such as disk-based storage device(s), solid-state storage device(s), and so forth. The persistent storage can have a relatively large storage capacity, but can have a relatively slow access speed.

An NVRAM can be implemented using electrically erasable programmable read-only memory (EEPROM) device(s). In other examples, an NVRAM can be implemented using battery-backed dynamic random access memory (DRAM) device(s) or battery-backed static random access memory (SRAM) device(s). The NVRAM is randomly accessible (both readable and writeable) on a page or byte basis (in other words, a page or byte of the NVRAM is individually accessible in response to a request, without retrieving another page or byte of the NVRAM). A page or byte has a smaller size than a physical block used in another type of storage device, such as a solid-state storage device (e.g., a flash memory device). A solid-state storage device can be written to on a block basis; in other words, a write to the solid-state storage device would write an entire physical block, rather than to a portion less than the size of the physical block. Generally, an NVRAM can be relatively expensive (e.g., more expensive than a solid-state storage device or a disk-based storage device), and thus an NVRAM included in the data storage system may have a relatively small size.

A volatile memory can be implemented using DRAM device(s), SRAM device(s), or any other type of memory where data stored in the memory is lost if power were removed from the memory. This is contrasted with the persistent storage or the NVRAM, which can maintain stored data even if power were removed from the persistent storage or the NVRAM.

In some examples, to improve performance of a data storage system when performing data deduplication, updates for incoming data values (that are part of writes) are added to a B-tree index, which can be stored in the NVRAM. The B-tree index stored in the NVRAM is considered a cache index, since the B-tree index is stored in a memory having a faster access speed than the persistent storage. Such a cache index is referred to as a "B-tree cache index." A B-tree cache index includes nodes arranged in a hierarchical manner. Leaf nodes of the B-tree cache index include update entries that map fingerprints to storage location indicators (e.g., SBNs). Intermediate nodes of the B-tree cache index are used to find a matching entry of the B-tree cache index based on a fingerprint.

The B-tree cache index can quickly grow in size as the quantity of incoming data values (and thus corresponding update entries) increases. If a large portion of the NVRAM is consumed by the B-tree cache index, then the NVRAM may not be available for other services performed by the data storage system. Moreover, merging update entries for the B-tree cache index from the NVRAM into the B-tree cache index can be expensive in terms of consumption of processing resources. In addition, performing a read of the B-tree cache index involves performing a binary search of the hierarchical nodes of the B-tree cache index, which can also be expensive in terms of consumption of processing resources.

In accordance with some implementations of the present disclosure, instead of implementing a cache index for a fingerprint index as a B-tree, the cache index can instead be implemented using a log structured hash table. In addition, in some examples, the cache index implemented as the log structured hash table can be stored in a persistent cache memory that is separate from the NVRAM. The persistent cache memory can be implemented using solid-state storage device(s), such as flash memory device(s), for example. A "persistent cache memory" is a cache memory that maintains data stored in the cache memory even when power is removed from the cache memory. Also, by storing updates to the cache index in a volatile memory instead of the NVRAM, expensive and limited storage space of the NVRAM can be made available to other processes of a system.

Although reference is made to implementing the persistent cache memory with solid-state storage device(s) in some examples, it is noted that the persistent cache memory can be implemented using other types of memory device(s) in other examples. In alternative examples, the cache index implemented as the log structured hash table can be stored in the NVRAM instead of in a separate persistent cache memory. In such alternative examples, the persistent cache memory is the NVRAM.

In the ensuing discussion, the cache index implemented as the log structured hash table is referred to as a cached fingerprint index. The fingerprint index stored in the persistent storage is referred to as a persistent fingerprint index. Note that the persistent fingerprint index may also be in the form of a log structured hash table.

In accordance with some implementations of the present disclosure, in response to incoming data values, fingerprint index updates for the fingerprint index are created and merged, in a merge operation, to the persistent fingerprint index in the persistent storage. As part of the merge operation, the fingerprint index updates are also mirrored to leaf blocks in the cached fingerprint index in the persistent cache memory, and further, an indirect block is updated that contains references to the leaf blocks in the cached fingerprint index that are used to receive the fingerprint index updates.

A fingerprint index includes different types of blocks, including leaf blocks and indirect blocks. A leaf block of a fingerprint index contains fingerprint index entries, where each fingerprint index entry maps a fingerprint for a data value to a storage location indicator (e.g., SBN) of the data value. The storage location indicator can be used to determine a storage location of the data value stored by the persistent storage.

An indirect block does not contain any fingerprint index entries; instead, an indirect block contains location information ("references") relating to locations of leaf blocks.

In some examples, a log structured hash table stores entries of a fingerprint index (cached fingerprint index or persistent fingerprint index) in a series of leaf blocks, with each leaf block including a number of buckets. Each leaf block of the fingerprint index is a unit of the log structured hash table and is uniquely identifiable using a block identifier (discussed further below). Each bucket is a partition of a leaf block, and is uniquely identifiable using a bucket identifier (discussed further below). A leaf block can include a number of buckets. Each bucket can in turn store multiple fingerprint index entries.

As the log structured hash table grows in size, additional blocks (leaf blocks and indirect blocks) are appended to the log structured hash table. The blocks of the log structured hash table are part of a log structured file system (LFS) according to some examples. In the log structured hash table, the fingerprint index entries of the fingerprint index are sorted in order of values of the fingerprints of the fingerprint index entries.

Unlike in a B-tree, a log structured hash table is not arranged as a hierarchical tree structure, but rather includes a sequence of portions (buckets) containing the fingerprint index entries in sorted order (in ascending or descending order of fingerprint values, for example). In some examples, the buckets can be included in leaf blocks, which can in turn be included in segments. The leaf blocks and buckets can be variably sized.

In some examples, searching a log structured hash table does not involve a binary search (as would be the case with a B-tree), which can allow the search of a fingerprint index to be more efficient than searching a B-tree. Rather, a log structured hash table is randomly accessible, in that a request to access the log structured hash table can retrieve an entry of the log structured hash table without having to perform a binary search through hierarchical nodes.

Arranging a fingerprint index as a log structured hash table can reduce usage of memory, reduce network bandwidth consumption of a data storage system, reduce consumption of processing resources, and so forth, as compared to using a B-tree fingerprint index.

FIG. 1 shows an example of a data storage system 102 that includes a volatile memory 104, an NVRAM 150, a persistent cache memory 152, and a persistent storage 112. Although a specific arrangement of components is shown in FIG. 1, it is noted that in other examples, the data storage system 102 can include a different arrangement of components.

The data storage system 102 also includes a storage controller 103 that includes various engines, including a deduplication engine 118, a merge engine 109, a recovery engine 170, and a garbage collector engine 180. Although specific engines are depicted in the example of FIG. 1, the storage controller 103 can include fewer or more engines in other examples.

Each engine can refer to a portion of a hardware processing circuit of the storage controller 103, or alternatively, can refer to machine-readable instructions (software and/or firmware stored on at least one machine-readable storage medium) executable by the hardware processing circuit of the storage controller 103. Also, in other examples, some of the engines may be separate from the storage controller 103.

In accordance with some implementations of the present disclosure, a persistent fingerprint index 110 (in the form of a log structured hash table) is stored in the persistent storage 112, and a cached fingerprint index 154 is stored in the persistent cache memory 152. The cached fingerprint index 154 is also in the form of a log structured hash table, and includes a portion of the persistent fingerprint index 110.

As incoming data values 114 (of write requests) are received by the data storage system 102, fingerprint index updates can be created for the incoming data values 114. The write requests can be received from a requester device (or multiple requester devices) that is (are) coupled to the data storage system 102 over a network, such as a local area network (LAN), a wide area network (WAN), a storage area network (SAN), and so forth. A requester device can refer to a server computer, a desktop computer, a notebook computer, a tablet computer, a smartphone, or any other type of electronic device. After data deduplication applied by the deduplication engine 118, data values of the write requests can be written to a data store 156 in the persistent storage 112.

A "fingerprint index update" can refer to update information for the fingerprint index for an incoming data value that is to be stored in the data storage system 102. For example, a fingerprint index update for an incoming data value can include a fingerprint (e.g., a hash value) computed for the incoming data value, and a storage location indicator (e.g., an SBN) for the data incoming value.

The ensuing discussion refers to SBNs used by the fingerprint indexes 110, 154. It is noted that techniques or mechanisms according to some examples can be used with other types of storage location indicators in the fingerprint indexes 110, 154.

Each fingerprint index update can be temporarily stored in a buffer. The volatile memory 104 includes an active update buffer 106 and a synchronization buffer 108 (referred to as a "sync buffer"). Although just one active update buffer 106 and one sync buffer 108 are shown in FIG. 1, in other examples, the data storage system 102 can include multiple active update buffers 106 and/or multiple sync buffers 108.

More generally, in other examples, the data storage system 102 can have a different arrangement. For example, instead of including both an active update buffer 106 and a sync buffer 108, just one buffer can be used.

The active update buffer 106 is used to receive fingerprint index updates 140 corresponding to incoming data values 114. The sync buffer 108 also stores fingerprint index updates. Fingerprint index updates in the sync buffer 108 are merged by the merge engine 109 with the persistent fingerprint index 110 in the persistent storage 112 of the data storage system 102.

The roles of the active update buffer 106 and the sync buffer 108 can change over time. The active update buffer 106 is to receive fingerprint index updates 140 while a merge of the fingerprint index updates 140 in the sync buffer 108 to the persistent fingerprint index 110 can proceed. Once the merge of the fingerprint index updates 140 in the sync buffer 108 to the persistent fingerprint index 110 is completed, the roles of the active update buffer 106 and the sync buffer 108 can switch when the active update buffer 106 is filled with fingerprint index updates 140 past a threshold (e.g., the number of fingerprint index updates 140 in the active update buffer 106 exceeds a threshold number or a threshold percentage of the storage capacity of the update buffer 106). The switching of the roles of the buffers 106 and 108 causes the buffer that was previously designated the active update buffer to become the sync buffer, and the buffer that was previously designated the sync buffer to become the active update buffer.

Figure 2:
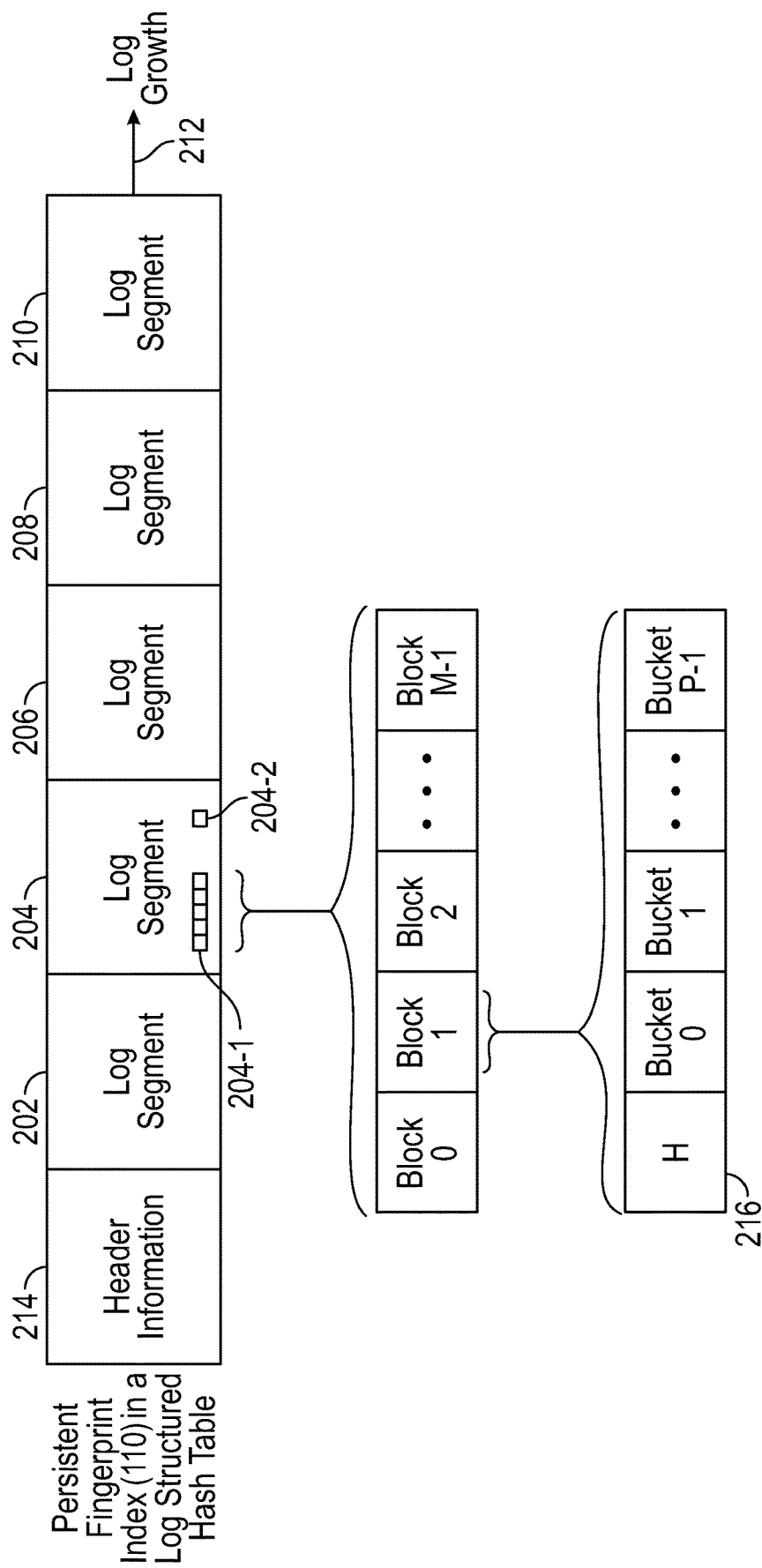
FIG. 2 is a block diagram of a persistent fingerprint index according to some examples.

With further reference to FIG. 2, further details are depicted for the persistent fingerprint index 110 that is arranged as a log structured hash table according to some examples. The log structured hash table of the cached fingerprint index 154 can have a similar arrangement.

In the example shown in FIG. 2, the log structured hash table includes log segments 202, 204, 206, 208, and 210. A log segment of the log structured hash table that contains the persistent fingerprint index 110 can have a fixed size in some examples, such as 32 megabytes (MB) or some other size. Each log segment can store a leaf block (or multiple leaf blocks) and/or an indirect block (or multiple indirect blocks). A leaf block (e.g., any of leaf blocks 204-1 in the log segment 204) stores fingerprint index entries. A "fingerprint index entry" includes a fingerprint and a corresponding SBN. An indirect block (e.g., 204-2 in the log segment 204) contains references to leaf blocks. A "reference" to a leaf block can include an indication of a location (e.g., a physical address) in the persistent storage 112 where the leaf block is stored.

In some examples, a leaf block that stores buckets containing fingerprint index entries can have a nominal size of 16 kilobytes (KB). A leaf block can grow in size up to 32 KB (an example leaf block maximum size) to accommodate more fingerprint index entries if the leaf block becomes full. In some examples, an indirect block can be 5 megabyte (MB) in size or another size.

Although specific size values have been specified for leaf and indirect blocks, it is noted that in other examples, leaf and indirect blocks can have other sizes.

As leaf blocks are added to the persistent fingerprint index 110 and a corresponding number of block references are added to an indirect block, the indirect block can become full (i.e., filled with block references to leaf blocks such that the indirect block does not have sufficient space to receive additional block references), another indirect block can be created and added to a log segment.

As further shown in FIG. 2, the log structured hash table that contains the persistent fingerprint index 110 grows in size by appending additional blocks in the direction indicated by arrow 212 (e.g., the additional blocks can be appended to an end of the log structured hash table).

The log structured hash table further includes header information 214 that identifies locations of indirect blocks (if present) within each log segment. Leaf blocks and indirect blocks can mix within a same log segment. The location information (in the header information 214) for each indirect block identifies a log segment (within which the indirect block is contained) and an offset within the log segment in which the indirect block is contained.

As further shown in FIG. 2, the log segment 204 includes multiple leaf blocks 204-1. For example, the multiple leaf blocks 204-1 include M leaf blocks, including block 0, block 1, block 2, . . . , block M−1, where M≥2. Each leaf block further includes P buckets, including bucket 0, bucket 1, . . . , bucket P−1, where P≥2.

Each bucket includes a number of fingerprint index entries, where each fingerprint index entry associates a fingerprint with a storage location indicator. Each fingerprint index entry includes a key-value pair, where the key is a fingerprint and the value is the corresponding SBN.

A leaf block also includes block header information 216, which includes information indicating the size of the leaf block, information indicating a number of fingerprint index entries in each of the N buckets of the leaf block, and other information.

The merge engine 109 performs a merge operation to merge fingerprint update entries in the sync buffer 108 with the leaf blocks of the persistent fingerprint index 110. Each fingerprint update entry in the sync buffer 108 can be in the form of a key-value pair (where the key is a fingerprint and the value is the corresponding SBN). The merge operation merges key-value pairs of the sync buffer 108 into the persistent fingerprint index 110 in sorted order (e.g., ascending order of fingerprints) of the key-value pairs in the sync buffer 108. For example, during the merge operation, the merge engine 109 can pass through the sync buffer 108 in order from a key-value pair with the lowest key (fingerprint) value to the key-value pair with the highest key (fingerprint) value.

As a result of merging key-value pairs from the sync buffer 108 in sorted order into the persistent fingerprint index 110, the resultant key-value pairs in the persistent fingerprint index 110 are also sorted by key (fingerprint) value.

If a log segment of the persistent fingerprint index 110 already contains existing key-value pairs prior to the merge operation, then the existing key-value pairs can be retrieved from the log segment into a stage area (not shown) of the memory 104, and the key-value pairs of the sync buffer 108 to be merged are also moved to the stage area. The existing key-value pairs of the log segment are merged with the key-value pairs of the sync buffer 108 in sorted order of key (fingerprint) values, and the sorted key-value pairs are then written from the staging area to the log segment of the persistent fingerprint index 110.

Data Deduplication

The deduplication engine 118 of the storage controller 103 performs data deduplication for the incoming data values 114. To perform data deduplication, the deduplication engine 118 uses a fingerprint index and a location index 116 (stored in the persistent storage 112). For each incoming data value 114, the deduplication engine 118 first attempts to perform a lookup of the cached fingerprint index 154. If the corresponding fingerprint for the incoming data value 114 is present in the cached fingerprint index 154, then the entry of the cached fingerprint index 154 can be used for data deduplication. However, if the corresponding fingerprint for the incoming data value 114 is not present in the cached fingerprint index 154, then the deduplication engine 118 accesses the corresponding entry from the persistent fingerprint index 110 to perform data deduplication Note that although the location index 116 is shown as stored in the persistent storage 112, in some cases, portions of the location index 116 may be retrieved into the memory 104 for faster lookup.

In examples where the persistent storage 112 includes a storage disk, the location index 116 is referred to as a "disk index." The location index 116 may be in the form of a B-tree index, or can have a different format in other examples.

As noted above, a fingerprint index (e.g., the cached fingerprint index 154 or the persistent fingerprint index 110) maps fingerprints to SBNs. More specifically, the fingerprint index maps partial fingerprints to SBNs. Partial fingerprints are discussed further below.

In some examples, the location index 116 maps SBNs to corresponding physical locations, such as physical addresses (ADDR) of the persistent storage 112. More specifically, each entry of multiple entries 117 (e.g., leaf nodes of a B-tree storing the location index 116) maps an SBN to a respective physical location (e.g., physical address, ADDR) as well as to a full fingerprint, Full FP (explained further below). Thus, given a fingerprint of an incoming data value, if a lookup of the fingerprint index (cached fingerprint index 154 or persistent fingerprint index 110) using the given fingerprint produces a match to an entry of the fingerprint index, then that match produces an SBN corresponding to the given fingerprint. The SBN is then used to look up the location index 116, which maps the SBN to a corresponding identifier of a physical location (e.g., a physical address) of a data value.

A partial fingerprint stored by the fingerprint index 110 or 154 includes a portion (i.e., less than an entirety) of a full fingerprint computed by applying a fingerprint function on the content of a data value. For example, a partial fingerprint can include a partial hash value that includes a portion of a full hash value (such as a subset of the bits that make up the full hash value). The bits that make up the partial hash value can be the least significant bits of the bits that make up the full hash value.

As shown in FIG. 1, the persistent fingerprint index 110 includes multiple entries 111, where each entry 111 maps a partial fingerprint (Partial FP) to a respective SBN. Similarly, the cached fingerprint index 154 includes multiple entries 155, where each entry 155 maps a partial fingerprint (Partial FP) to a respective SBN. The entries 111, 155 of the respective persistent/cached fingerprint indexes 110, 154 are included in the buckets of the log structured hash tables discussed above.

In some examples, a lookup of the fingerprint index 154 or 110 is a lookup of a partial fingerprint computed based on an incoming data value 114. In such examples, a match of the partial fingerprint in the fingerprint index is not conclusive regarding whether or not a duplicative data value is already stored in the data store 156. Because a partial fingerprint is used by the fingerprint index 154 or 110 potentially multiple different data values can produce the same partial fingerprint.

In such examples, to confirm that the matching entry 155 or 111 of the fingerprint index 154 or 110 (that matches a partial fingerprint of a given incoming data value 114) actually corresponds to a duplicate of the given incoming data value 114, the SBN of the matching entry 155 or 111 of the fingerprint index 154 or 110 is used to retrieve the corresponding entry 117 of the location index 116, where the retrieved entry 117 of the location index 116 maps the SBN to a physical location of the given incoming data value 114 and the full fingerprint of the given incoming data value 114.

The deduplication engine 118 is able to determine, based on the full fingerprint from the location index 116, whether or not the data storage system 102 actually contains a duplicate of the given incoming data value 114. More specifically, the deduplication engine 118 compares the full fingerprint computed for the given incoming data value 114 to the full fingerprint retrieved from the location index 116. In such examples, if the full fingerprints match, then the deduplication engine 118 can make a determination that a duplicate of the given incoming data value 114 is already stored (in the data store 156) in the data storage system 102. As a result, the deduplication engine 118 can decide to not write the given incoming data value 114 to the persistent storage 112, but instead, can update a count of the number of instances of the data value (sharing the matching full fingerprint) that have been received.

On the other hand, if the full fingerprint computed for the given incoming data value 114 does not match the full fingerprint retrieved from the location index 116, then that indicates that the data storage system 102 does not store a duplicate of the given incoming data value 114. As a result, the given incoming data value 114 is written to the data store 156 of the persistent storage 112. In addition, the deduplication engine 118 produces a fingerprint index update 140 for the given incoming data value. Note that a fingerprint index update 140 is not produced for an incoming data value that is duplicative of a data value already stored at the persistent storage 112.

As shown in FIG. 1, the deduplication engine 118 includes a data value hasher 120. The data value hasher 120 can be implemented using a portion of the hardware processing circuit of the deduplication engine 118, or alternatively, can include machine-readable instructions executable by a hardware processing circuit of the storage controller 103. Although the data value hasher 120 is shown as being part of the deduplication engine 118, it is noted that in other examples, the data value hasher 120 can be separate from the deduplication engine 118.

A fingerprint produced by the data value hasher 120 can include a hash value. In other examples, a different type of fingerprint generator can be used to generate another type of a fingerprint. The data value hasher 120 produces both a full fingerprint (e.g., a full hash value) that is to be stored in the location index 116 and a partial fingerprint (e.g., a partial hash value) that is to be stored in the fingerprint indexes 154, 110.

Merge of Fingerprint Index Updates

Figure 3:
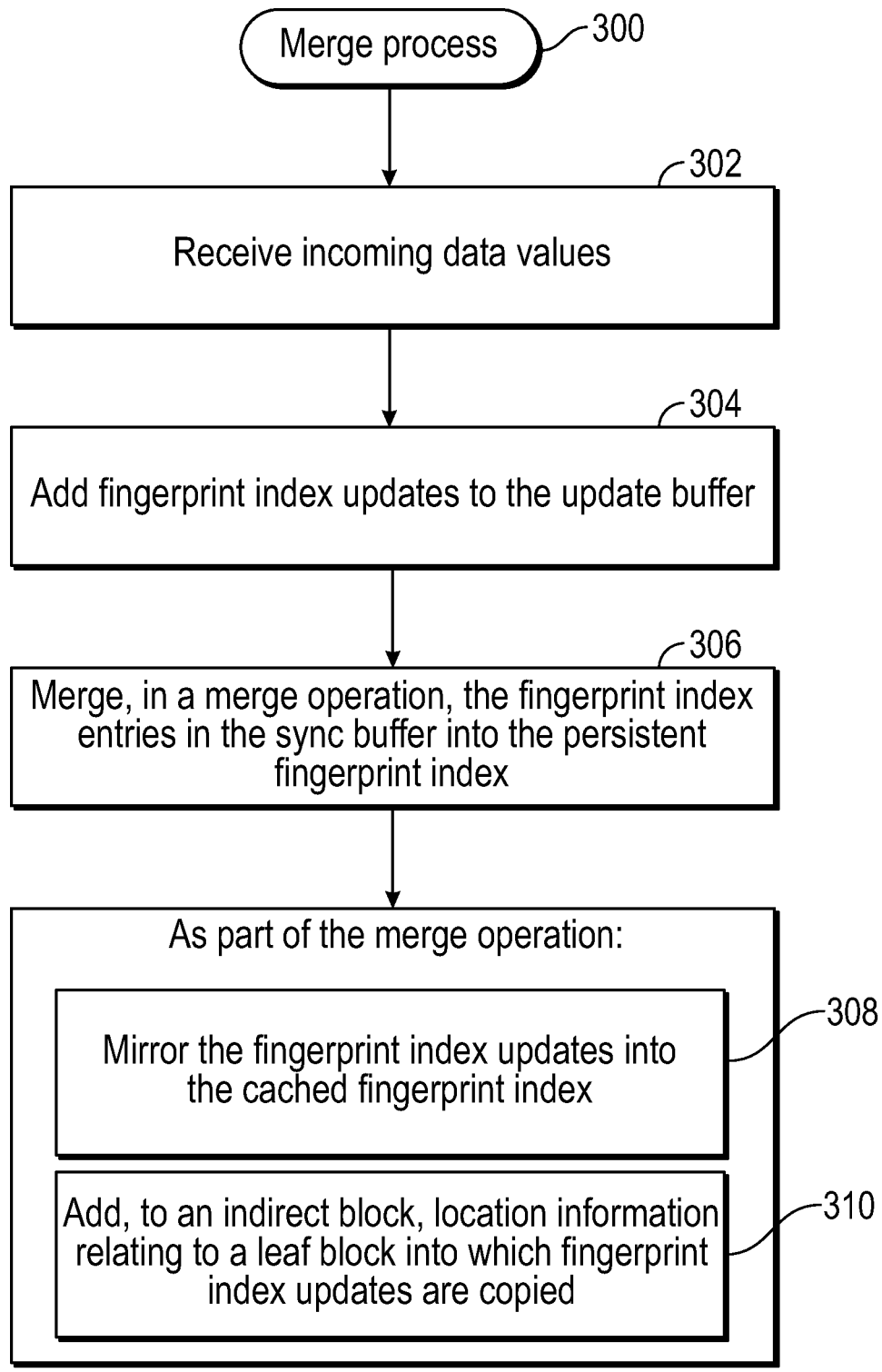
FIG. 3 is a flow diagram of a merge process according to some examples.

FIG. 3 is a flow diagram of a merge process 300 performed by the storage controller 103 according to some examples. The storage controller 103 receives (at 302) incoming data values 114. Based on the incoming data values 114, the storage controller 103 produces fingerprint index updates 140 (FIG. 1) that are added (at 304) to the active update buffer 106 in the memory 104, according to some examples. Specifically, for the incoming data values 114, the data value hasher 120 produces respective partial fingerprints (as well as respective full fingerprints), where the partial fingerprints are included in the fingerprint index updates 140. Each fingerprint index update 140 further contains the corresponding SBN.

In examples where both the active update buffer 106 and the sync buffer 108 are used, the active update buffer 106 can be switched to become the sync buffer 108 at some point, such as in response to the active update buffer 106 becoming full. The merge engine 109 of the storage controller 103 merges (at 306), in a merge operation, the fingerprint index entries in the sync buffer 108 into the persistent fingerprint index 110. The merging of the fingerprint index updates into the persistent fingerprint index 110 can include adding fingerprint index updates to existing leaf block(s) of the persistent fingerprint index 110 and/or creating a new leaf block in the persistent fingerprint index 110 for adding fingerprint index entries. A new leaf block is created to add fingerprint index entries that have fingerprint values that do not correspond to any existing leaf block of the persistent fingerprint index 110. Note that each existing leaf block of the persistent fingerprint index 110 is to store fingerprint index entries containing fingerprint values that span from a leading fingerprint value to an ending fingerprint value.

As part of the merge operation that merges the fingerprint index updates into the persistent fingerprint index 110, the merge engine 109 mirrors (at 308) the fingerprint index updates into the cached fingerprint index 154 in the persistent cache memory 152, and further adds (at 310), to an indirect block 142 (FIG. 1) location information relating to a leaf block (a cached leaf block of the cached fingerprint index 154) into which the fingerprint index updates are copied. The indirect block 142 is a "shadow" indirect block that refers to a location of a leaf block in the cached fingerprint index 154 in the persistent cache memory 152. In accordance with some implementations of the present disclosure, the location information is added to the indirect block 142 instead of to a B-tree cache index.

The indirect block 142 is cached in the memory 104, and can be a cached version of an indirect block 162 in the persistent cache memory 152.

Using techniques or mechanisms in which fingerprint index updates are mirrored to the cached fingerprint index 154 and locations of cached leaf blocks are added to the indirect block 142 in the volatile memory 104, a B-tree cache index in the NVRAM 150 does not have to be used, such that the fingerprint index updates and corresponding location information do not have to be added to such B-tree cache index.

The mirroring of the fingerprint index updates into the cached fingerprint index 154 refers to copying the fingerprint index updates to existing leaf block(s) and/or creating a new leaf block to accommodate fingerprint index updates, which mirrors updates performed at the persistent fingerprint index 110.

The location information relating to the cached leaf block is location information that indicates the location in the persistent cache memory 152 where the leaf block is stored. In FIG. 1, the location information relating to a leaf block is in the form of a block reference 144. A block reference 144 can include a physical address of a location in the persistent cache memory 152 where a leaf block of the cached fingerprint index 154 is stored.

In some examples, when a fingerprint index update mirrored (at 308) to the cached fingerprint index 154 causes a new leaf block to be created in the cached fingerprint index 154 (which mirrors the creation of a new leaf block in the persistent fingerprint index 110), the location information (block reference 144) of the new leaf block is added (at 310) to the indirect block 142.

According to some implementations of the present disclosure, the updating of the persistent fingerprint index 110 and the cached fingerprint index 154 with the fingerprint index updates is a shared update. The shared update allows for the cached fingerprint index 154 to be maintained in a consistent state with respect to the persistent fingerprint index 110. Moreover, in some examples, the shared update ensures that fingerprint index updates that are merged with the persistent fingerprint index 110 and copied to the cached fingerprint index 154 are committed together. The merge operation that merges the fingerprint index updates can be considered a transaction that is either committed in its entirety or is aborted if the transaction cannot finish. Committing fingerprint index updates of a merge operation can refer to marking the updates as being successfully persistently stored into the persistent fingerprint index 110 and the cached fingerprint index 154. In this manner, updates to both the persistent fingerprint index 110 and the cached fingerprint index 154 are committed together or not at all.

By adding, to the indirect block 142, location information relating to leaf block(s) of the cached fingerprint index 154 into which the fingerprint index updates are copied as part of the merge operation, the location information relating to the leaf block(s) does not have to be added as a separate entry in the NVRAM 150 (FIG. 1). As a result, NVRAM space is not consumed for purposes of merging fingerprint index updates to the persistent fingerprint index 110.

Also, by mirroring the fingerprint index updates of the merge operation into the cached fingerprint index 154, separate update and sync buffers do not have to be provided in the memory 104 for the cached fingerprint index 154. Not including separate update and sync buffers for the cached fingerprint index 154 reduces the amount of the memory 104 consumed for the merge operation, and also the amount of processing involved in performing fingerprint index maintenance.

Lookups for Data Deduplication

Figure 4:
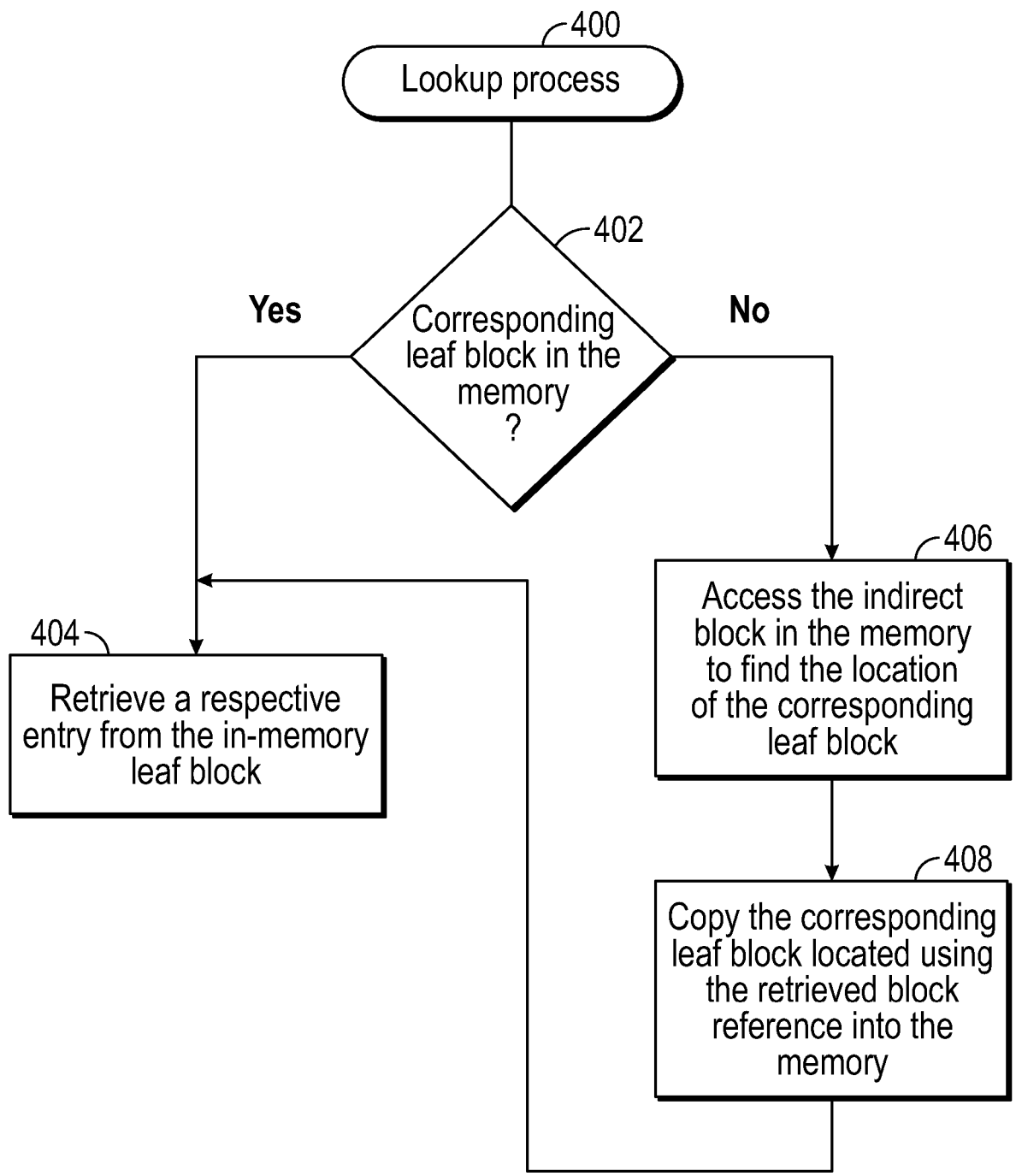
FIG. 4 is a flow diagram of a lookup process according to some examples.

FIG. 4 is a flow diagram of a lookup process 400 to perform a lookup of the cached fingerprint index 154 during a deduplication operation performed by the deduplication engine 118 (FIG. 1). The deduplication operation is performed for an incoming data value 114, for determining whether or not a duplicate of the incoming data value 114 is already stored in the persistent storage 112 and thus does not have to be stored again.

The lookup process 400 determines (at 402) whether a corresponding leaf block (of the cached fingerprint index 154) for the incoming data value 114 is in the memory 104. This determination is based on computing a block identifier (for a leaf block) based on the partial fingerprint computed from the incoming data value 114.

In some examples, the block identifier of a leaf block is computed according to Eq. 1:

$$\text{Block Identifier} = \frac{\text{Bucket Identifier}}{\text{Number of Buckets per Block}}. \quad \text{(Eq. 1)}$$

The bucket identifier is computed according to Eq. 2:

$$\text{Bucket Identifier} = \frac{fp}{S}, \quad \text{(Eq. 2)}$$

where fp represents the partial fingerprint value of the incoming data value 114, and S represents a bucket span that is the distance between a first key (a first fingerprint value) and a last key (a last fingerprint value) in a bucket.

The block identifier can be used as an index into the indirect block 142 (FIG. 1), where the index points to an entry in the indirect block 142. The entry indexed by the block identifier contains a block reference 144 (FIG. 1) that indicates a location of the corresponding leaf block in the cached fingerprint index 154.

Although specific equations are used for computing the block identifier in some examples, it is noted that the block identifier can be computed in a different way in other examples.

The determination of whether the leaf block corresponding to the incoming data value 114 is in the memory 104 can be based on whether the memory 104 contains the leaf block having the block identifier computed from the partial fingerprint of the incoming data value 114.

If the corresponding leaf block is stored in the memory 104 (this leaf block is referred to as an "in-memory leaf block"), then the lookup process 400 can retrieve (at 404) a respective entry for the incoming data value 114 from the in-memory leaf block, for purposes of performing data duplication. The retrieved entry contains a mapping between the partial fingerprint of the incoming data value 114 and a corresponding SBN, which can be used to perform a lookup of the location index 116 (FIG. 1) to retrieve the corresponding full fingerprint used for data deduplication as explained further above.

If the corresponding leaf block is not in the memory 104, then the lookup process 400 accesses (at 406) the indirect block 142 in the memory 104 to find the location of the corresponding leaf block. The block identifier computed from the partial fingerprint of the incoming data value 114 is used as an index into the indirect block 142, to retrieve a respective block reference 144, as discussed above.

The retrieved block reference 144 is used to locate the corresponding leaf block contained in the cached fingerprint index 154 stored in the persistent cache memory 152. The lookup process 400 copies (at 408) the corresponding leaf block located using the retrieved block reference 144 into the memory 104. The lookup process 400 then retrieves (at 404) the respective entry for the incoming data value 114 from the in-memory leaf block, for purposes of performing data duplication The access of the cached fingerprint index 154 based on use of the indirect block 142 in the memory 104 as discussed above can be performed more quickly than would be the case in accessing a B-tree cache index, which would involve a binary search of the B-tree cache index to find the corresponding leaf block.

In examples where there are multiple indirect blocks, some of the indirect blocks 162 (FIG. 1) may be stored in the persistent cache memory 152, and may not be stored in the memory 104. For example, the memory 104 may be used to cache some number of indirect blocks (where the number can be 1 or greater than 1). As the indirect block 142 in the memory 104 becomes full (i.e., the indirect block 142 is filled with block references 144 so the indirect block 142 can no longer accept more block references), the indirect block 142 is written to the persistent cache memory 152, and a new indirect block is created and stored in the memory 104.

In cases where the corresponding leaf block is not in the memory 104, and the indirect block 142 is also not in the memory 104, the lookup process 400 can access indirect block location information 160 stored in the NVRAM 150, for example. The indirect block location information 160 specifies the locations of respective indirect blocks 162 that are stored in the persistent cache memory 152. The indirect block location information 160 can map ranges of block identifiers to respective indirect blocks 162. The block identifier generated based on the partial fingerprint for an incoming data value 114 can be used determine which of the indirect blocks 162 is relevant for the incoming data value 114, and the relevant indirect block 162 can be retrieved from the persistent cache memory 152 into the memory 104.

Recovery from Crash During Merge

During a merge operation in which fingerprint index updates are merged to the persistent fingerprint index 110 (and also mirrored to the cached fingerprint index 154), a crash may occur that can result in the merge operation not completing. A crash may occur during the merge operation as a result of a hardware error, an error during execution of machine-readable instructions, a communication error, and so forth.

As noted above, as part of the merge operation, updates are made to the indirect block 142 in the memory 104. The updates to the indirect block 142 may not be persistently stored in the data storage system 102. As result, the crash may cause the content of the indirect block 142 in the memory 104 to be lost. If the indirect block 142 in the memory 104 is lost, then the storage controller 103 is unable to determine which leaf blocks of the cached fingerprint index were updated as a result of a merge operation (but not yet committed)

Prior to the crash, fingerprint index updates merged to the persistent fingerprint index 110 and mirrored to the cached fingerprint index 154 may not have been committed. To perform recovery from the crash, information stored in the NVRAM 150 can be used to determine which sections of the cached fingerprint index 154 has (have) not yet been committed.

The information stored in the in the NVRAM 150 that is used to recover from a crash during a merge operation includes section information 164. The section information 164 contains section identifiers 166 that identify respective sections of the cached fingerprint index 154. A "section" of the cached fingerprint index 154 can be larger in size than a leaf block—for example, a section may include multiple leaf blocks. In some examples, a section can be the size of a log segment as shown in FIG. 2 (or may be larger than a log segment). In some examples, commitment of fingerprint index updates is performed at the granularity of a section (i.e., the entire section is committed or not at all).

The section information 164 also includes status indicators 168 associated with the respective section identifiers 166. The status indicator 168 associated with a corresponding section identifier indicates whether or not the corresponding section of the cached fingerprint index 154 has been committed. For example, if the status indicator 168 has a first value (e.g., "1" or a different value), then that indicates that the corresponding section of the cached fingerprint index 154 has been committed. If the status indicator 168 has a different second value (e.g., "0" or another value), then that indicates that the corresponding section of the cached fingerprint index 154 has not been committed.

The size of the section information 164 containing the section identifiers and corresponding status indicators is relatively small as compared to the sections of the cached fingerprint index 154. Thus, storing the section information 164 in the NVRAM 150 does not consume a lot of storage space of the NVRAM 150.

Figure 5:
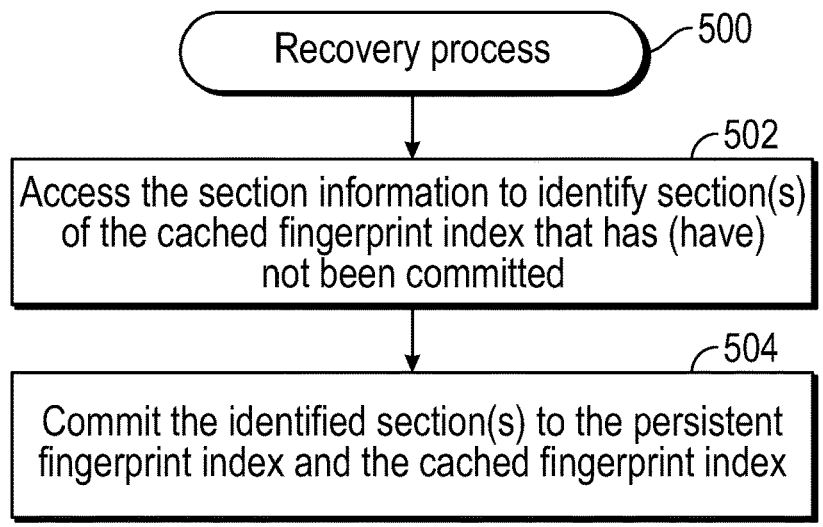
FIG. 5 is a flow diagram of a recovery process according to some examples.

FIG. 5 is a flow diagram of a recovery process 500 that can be performed by the recovery engine 170 of the storage controller 103. The recovery process 500 is initiated by the recovery engine 170 in response to a crash. The crash may be indicated by a crash indicator stored in the NVRAM 150, or the crash indicator can be provided by another entity of the data storage system 102, such as an operating system (OS), a basic input/output system (BIOS), and so forth.

The recovery process 500 accesses (at 502) the section information 164 to identify section(s) of the cached fingerprint index 154 that has (have) not been committed. The corresponding section(s) of the persistent fingerprint index 110 would also not have been committed, since as discussed further above, commitment of fingerprint index updates involves commitment of both updates to the persistent fingerprint index 110 as well as the mirrored updates to the cached fingerprint index 154.

For the identified section(s) of the cached fingerprint index 154 that has (have) not been committed, the recovery process 500 commits (at 504) the identified section(s) to the persistent fingerprint index 110 and the cached fingerprint index 154. Committing the identified section(s) to the persistent fingerprint index 110 and the cached fingerprint index 154 refers to writing the fingerprint index entries of the identified section(s) to the persistent fingerprint index 110 and the cached fingerprint index 154 and marking such written fingerprint index entries as persistently stored.

A crash may cause loss of fingerprint index updates in the active update buffer 106 and the sync buffer 108. In some examples, fingerprint index updates in the active update buffer 106 and the sync buffer 108 are not recovered. Since the fingerprint index updates in the active update buffer 106 and the sync buffer 108 are used for purposes of data deduplication, not recovering the fingerprint index updates in the active update buffer 106 and the sync buffer 18 may result in the data deduplication not identifying all the duplicate instances of data values, such that some duplicate data values may be stored into the persistent storage 112. However, less than ideal data deduplication may be acceptable in some scenarios, and may not have any noticeable impact on the overall performance of the data storage system 102.

Garbage Collection

Garbage collection can be performed to remove older sections of the cached fingerprint index 154 from the persistent cache memory 152 to make room for additional fingerprint index updates to be added to the cached fingerprint index 154.

The garbage collector engine 180 of the storage controller 103 can perform garbage collection. The garbage collector engine 180 can track the frequency of use of respective leaf blocks of the cached fingerprint index 154. The frequency of use of each leaf block of the cached fingerprint index 154 can be indicated in block usage information 172, which can be stored in the memory 104, for example.

The block usage information 172 includes leaf block identifiers 174 and respective use indicators 176. A use indicator 176 can be set to different values to indicate respective different frequencies of use of the corresponding leaf block of the cached fingerprint index 154. For example, a first value of the use indicator may indicate that the corresponding leaf block has a first frequency of use, a second value of the use indicator may indicate that the corresponding leaf block has a second frequency of use that is greater than the first frequency of use, a third value of the use indicator may indicate that the corresponding leaf block has a third frequency of use that is greater than the second frequency of use, and so forth.

As leaf blocks of the cached fingerprint index 154 are accessed, the storage controller can update the respective use indicators 176 in the block usage information 172.

Figure 6:
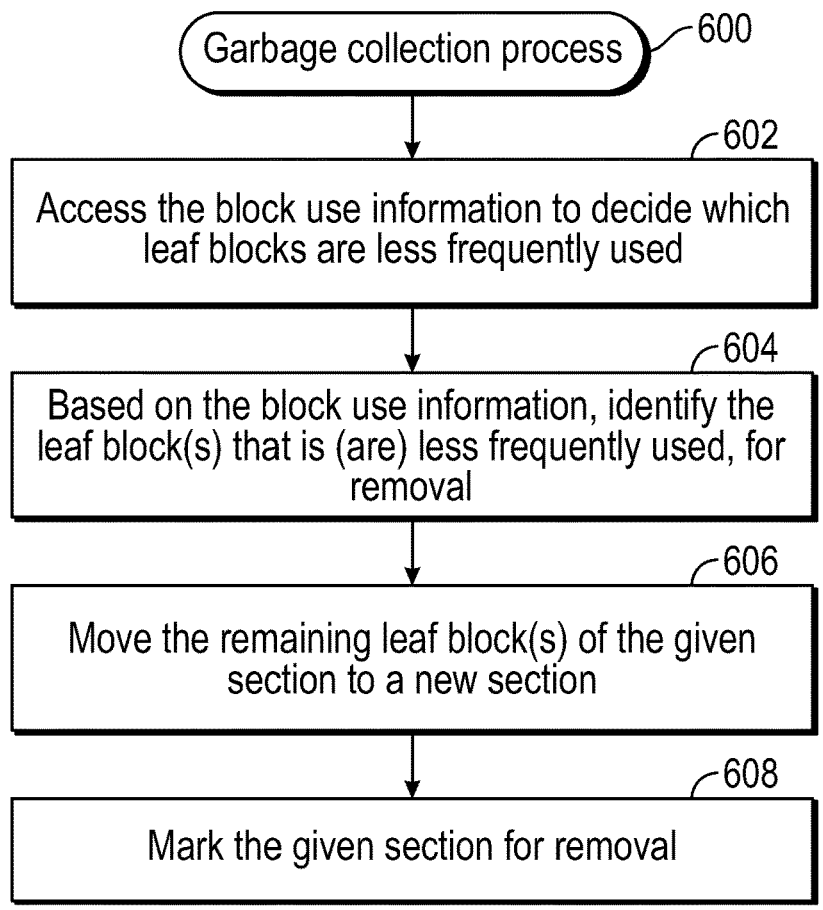
FIG. 6 is a flow diagram of a garbage collection process according to some examples.

FIG. 6 is a flow diagram of a garbage collection process 600 according to some examples. The garbage collection process 600 may be performed by the garbage collector engine 180, for example.

The garbage collection process 600 may be triggered in response to the cached fingerprint index 154 having grown to a size that exceeds a specified threshold, such as a threshold percentage of the persistent cache memory 152. In response to the triggering event, the garbage collection process 600 can decide which leaf block(s) of the cached fingerprint index 154 to remove from the persistent cache memory 152.

The garbage collection process 600 accesses (at 602) the block use information 172 to decide which leaf blocks are less frequently used than other leaf blocks. Based on the block use information 172, the garbage collection process 600 identifies (at 604) the leaf block(s) that is (are) less frequently used, for removal. This identification is based on comparing values of the use indicators of the respective leaf blocks of the cached fingerprint index 154. The number of leaf block(s) identified can be dependent upon how much space in the persistent cache memory 152 is to be freed up.

The identified leaf block(s) can be part of a given section of the cached fingerprint index 154. The garbage collection process 600 can move (at 606) the remaining leaf block(s) of the given section to a new section of the cached fingerprint index 154. The remaining leaf block(s) of the given section refers to the leaf block(s) other than the identified leaf block(s) that is (are) less frequently used.

The garbage collection process 600 marks (at 608) the given section for removal, such that the given section can be removed from the persistent cache memory 152 at the next opportunity (such as during an idle time period of the data storage system 102).

Further Examples

Figure 7:
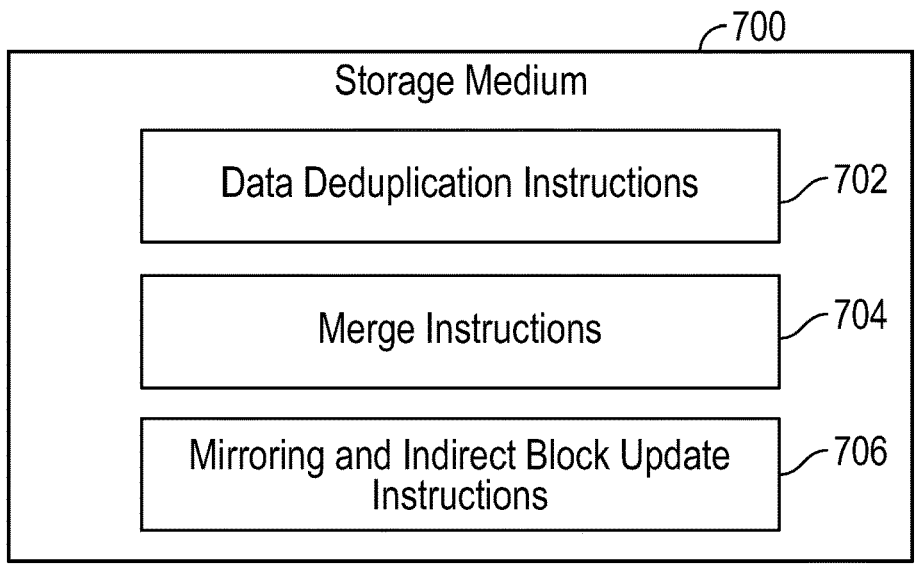
FIG. 7 is a block diagram of a storage medium storing machine-readable instructions according to some examples.

FIG. 7 is a block diagram of a non-transitory machine-readable or computer-readable storage medium 700 storing machine-readable instructions that upon execution cause a system (e.g., the data storage system 102 or another computing system having a computer or multiple computers) to perform various tasks.

The machine-readable instructions include data deduplication instructions 702 to perform data deduplication using a deduplication fingerprint index in a hash data structure including a plurality of blocks, where a block of the plurality of blocks includes fingerprints computed based on content of respective data values. As used here, a "hash data structure" can refer to a data structure that stores keys (e.g., the partial fingerprints) in a sorted order (e.g., ascending order, descending order, etc.). An example of the hash data structure is a log based hash table.

The machine-readable instructions include merge instructions 704 to merge, in a merge operation, updates for the deduplication fingerprint index to the hash data structure stored in a persistent storage.

The machine-readable instructions include mirroring and indirect block update instructions 706 to, as part of the merge operation, mirror the updates to a cached copy of the hash data structure in a cache memory, and update, in an indirect block, information regarding locations of blocks in the cached copy of the hash data structure.

In some examples, the cache memory is a persistent cache memory (e.g., 152 in FIG. 1).

In some examples, the indirect block is stored in a volatile memory (e.g., 104 in FIG. 1).

In some examples, the machine-readable instructions are to further, as part of the data deduplication, retrieve, from the cached copy of the hash data structure, a block of the plurality of blocks using the location information in the indirect block, obtain a fingerprint for an incoming data value using the retrieved block, and use the obtained fingerprint to perform data deduplication of the incoming data value.

In some examples, the machine-readable instructions are to perform data deduplication for an incoming data value by determining whether an indirect block is stored in a volatile memory, and in response to determining that the indirect block is not stored in the volatile memory, copy the indirect block from the cache memory into the volatile memory.

In some examples, the machine-readable instructions are to, responsive to a crash during the merge operation, determine which section of the cached copy of the hash data structure has not been committed, and perform a recovery of the section.

In some examples, the machine-readable instructions are to identify a first subset of blocks of a plurality of blocks in the cached copy of the hash data structure that is used less than a second subset of blocks of the plurality of blocks in the cached copy of the hash data structure, and perform garbage collection on the first subset of blocks.

Figure 8:
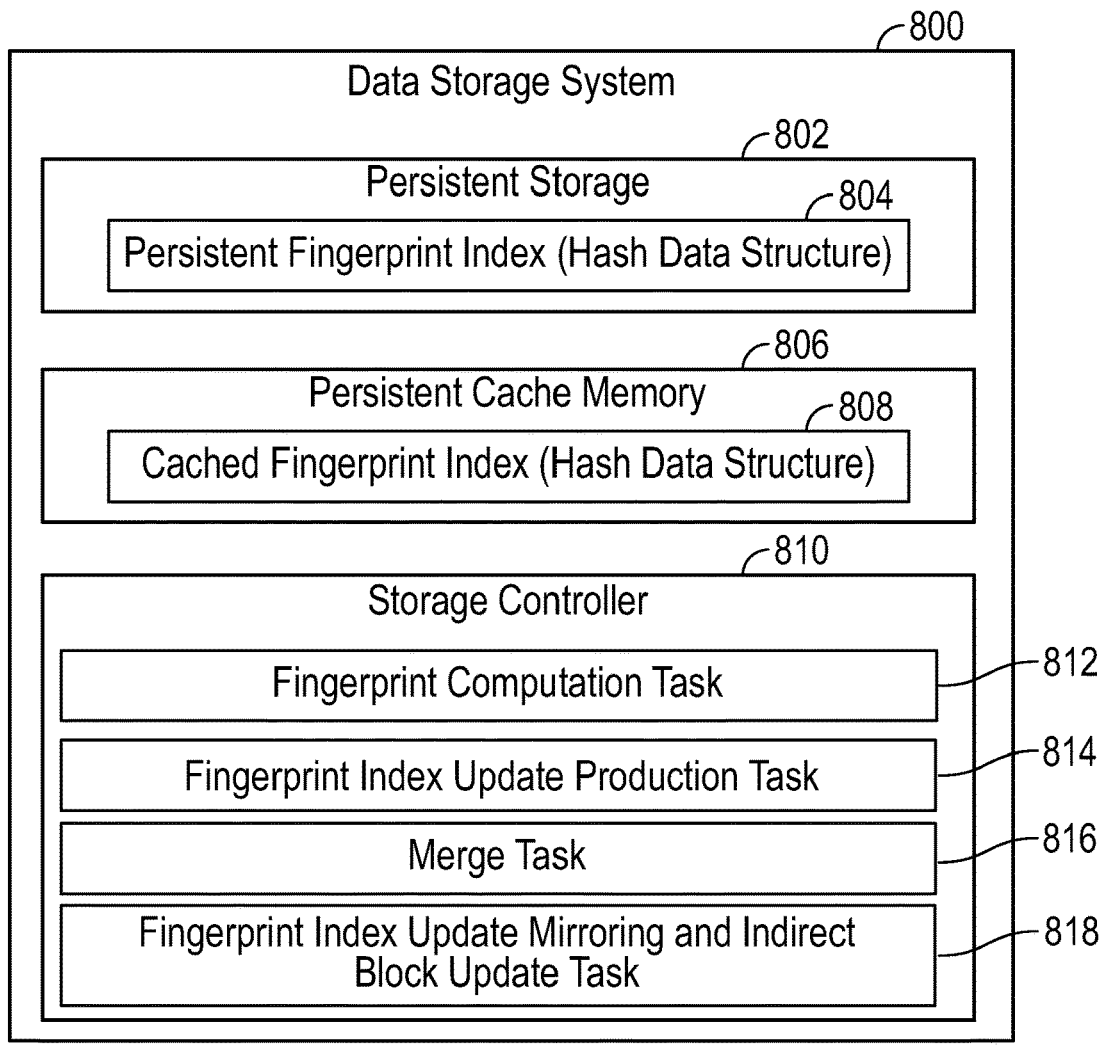
FIG. 8 is a block diagram of a data storage system according to some examples.

FIG. 8 is a block diagram of a data storage system 800 according to some examples. The data storage system 800 includes a persistent storage 802 to store a persistent fingerprint index 804 having a hash data structure, and a persistent cache memory 806 to store a cached fingerprint index 808 having a hash data structure.

The data storage system 800 includes a storage controller 810 to perform various tasks. The tasks include a fingerprint computation task 812 to compute fingerprints based on incoming data values for storing in the data storage system 800.

The tasks further include a fingerprint index update production task 814 to produce fingerprint index updates based on the computed fingerprints. The tasks further include a merge task 816 to perform a merge operation to merge the fingerprint index updates to the persistent fingerprint index.

The tasks further include a fingerprint index update mirroring and indirect block update task 818 to, as part of the merge operation, mirror the fingerprint index updates to the cached fingerprint index, and add, to an indirect block, location information of leaf blocks of the cached fingerprint index to which the fingerprint index updates have been added, wherein the location information specifies locations of the leaf blocks in the persistent cache memory.

Figure 9:
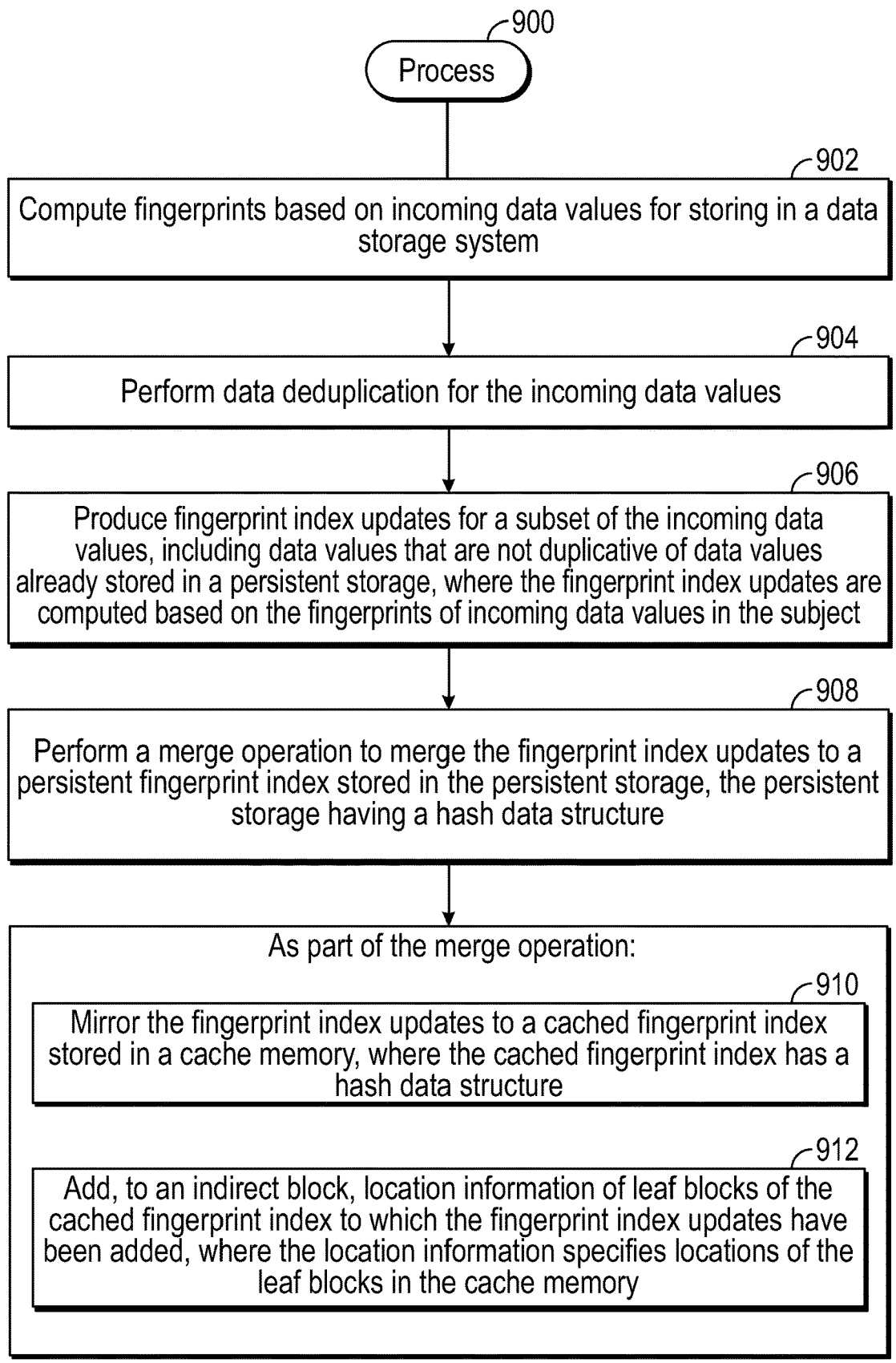
FIG. 9 is a flow diagram of a process according to some examples.

FIG. 9 is a flow diagram of a process 900 according to some examples, which may be performed by a storage controller (e.g., 103 in FIG. 1).

The process 900 includes computing (at 902) fingerprints based on incoming data values for storing in a data storage system.

The process 900 includes performing (at 904) data deduplication for the incoming data values, and producing (at 906) fingerprint index updates for a subset of the incoming data values, the subset including data values that are not duplicative of data values already stored in a persistent storage, and the fingerprint index updates computed based on the fingerprints of incoming data values in the subset.

The process 900 includes performing (at 908) a merge operation to merge the fingerprint index updates to a persistent fingerprint index stored in the persistent storage, the persistent storage having a hash data structure.

The process 900 includes, as part of the merge operation, mirroring (at 910) the fingerprint index updates to a cached fingerprint index stored in a cache memory, and adding (at 912), to an indirect block, location information of leaf blocks of the cached fingerprint index to which the fingerprint index updates have been added, wherein the location information specifies locations of the leaf blocks in the cache memory, and the cached fingerprint index has a hash data structure.

A storage medium (e.g., 700 in FIG. 7) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory or other type of non-volatile memory device; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a data storage system to:
   provide, in a persistent storage, a persistent fingerprint index comprising a log structured hash table;
   store, in a persistent cache memory, a cached fingerprint index comprising a log structured hash table, wherein the log structured hash table of the cached fingerprint index comprises a series of leaf blocks containing fingerprint index entries in sorted order;
   compute fingerprints based on incoming data values for storing in the data storage system,
   produce fingerprint index updates based on the computed fingerprints;
   perform a merge operation to merge the fingerprint index updates to the persistent fingerprint index;
   as part of the merge operation, mirror the fingerprint index updates to the cached fingerprint index, and add, to an indirect block of the log structured hash table of the cached fingerprint index, location information of respective leaf blocks of the cached fingerprint index to which the fingerprint index updates have been added, wherein the location information specifies locations of the respective leaf blocks in the persistent cache memory;
   in response to a given incoming data value, access the indirect block to determine a location of a leaf block of the cached fingerprint index containing a fingerprint index entry for the given incoming data value; and
   use the fingerprint index entry to perform data deduplication for the given incoming data value.

2. The non-transitory machine-readable storage medium of claim 1, wherein the location information comprises addresses of the respective leaf blocks in the persistent cache memory.

3. The non-transitory machine-readable storage medium of claim 1, wherein the indirect block is cached in a volatile memory.

4. The non-transitory machine-readable storage medium of claim 3, wherein the instructions upon execution cause the data storage system to:
   to perform data deduplication for a further incoming data value, determine whether the indirect block is stored in the volatile memory; and
   in response to determining that the indirect block is not stored in the volatile memory, copy the indirect block from the persistent cache memory into the volatile memory.

5. The non-transitory machine-readable storage medium of claim 1, wherein the merging of the fingerprint index updates to the persistent fingerprint index and the mirroring of the fingerprint index updates to the cached fingerprint index are part of a shared update to maintain the cached fingerprint index consistent with the persistent fingerprint index.

6. The non-transitory machine-readable storage medium of claim 1, wherein a leaf block of the series of leaf blocks contains fingerprint index entries that span from a leading fingerprint value to an ending fingerprint value.

7. The non-transitory machine-readable storage medium of claim 1, wherein the instructions upon execution cause the data storage system to:
   responsive to a crash during the merge operation,
      determine which section of the log structured hash table of the cached fingerprint index has not been committed to the persistent fingerprint index, and
      perform a recovery of the section.

8. The non-transitory machine-readable storage medium of claim 7, wherein the instructions upon execution cause the data storage system to:
  maintain indicators regarding which sections of the log structured hash table of the cached fingerprint index have been committed to the persistent fingerprint index, and which sections of the log structured hash table of the cached fingerprint index have not been committed to the persistent fingerprint index.

9. The non-transitory machine-readable storage medium of claim 8, wherein the indicators are stored in a non-volatile random access memory, and wherein the mirroring of the fingerprint index updates and the adding of the location information of the respective leaf blocks to the indirect block do not employ a B-tree cache index in the non-volatile random access memory.

10. The non-transitory machine-readable storage medium of claim 1, wherein a fingerprint index update of the fingerprint index updates maps a fingerprint to a respective storage location indicator for an incoming data value.

11. A data storage system comprising:
  a persistent storage to store a persistent fingerprint index comprising a log structured hash table;
  a persistent cache memory to store a cached fingerprint index comprising a log structured hash table, wherein the log structured hash table of the cached fingerprint index comprises a series of leaf blocks containing fingerprint index entries in sorted order;
  a hardware processing circuit; and
  at least one machine-readable storage medium comprising instructions executable by the hardware processing circuit to:
    compute fingerprints based on incoming data values for storing in the data storage system,
    produce fingerprint index updates based on the computed fingerprints,
    perform a merge operation to merge the fingerprint index updates to the persistent fingerprint index,
    as part of the merge operation, mirror the fingerprint index updates to the cached fingerprint index, and add, to an indirect block of the log structured hash table of the cached fingerprint index, location information of respective leaf blocks of the cached fingerprint index to which the fingerprint index updates have been added, wherein the location information specifies locations of the respective leaf blocks in the persistent cache memory,
    in response to a given incoming data value, access the indirect block to determine a location of a leaf block of the cached fingerprint index containing a fingerprint index entry for the given incoming data value, and
    use the fingerprint index entry to perform data deduplication for the given incoming data value.

12. The data storage system of claim 11, wherein a fingerprint index update of the fingerprint index updates maps a fingerprint to a respective storage location indicator for an incoming data value.

13. The data storage system of claim 11, wherein the location information comprises addresses of the respective leaf blocks in the persistent cache memory.

14. The data storage system of claim 11, wherein the instructions are executable to cache a copy of the indirect block in a volatile memory.

15. The data storage system of claim 14, wherein the instructions are executable to:
  as part of data deduplication for a further incoming data value, determine whether the indirect block is stored in the volatile memory; and
  in response to determining that the indirect block is not stored in the volatile memory, copy the indirect block from the persistent cache memory into the volatile memory.

16. The data storage system of claim 11, wherein the instructions are executable to:
  responsive to a crash during the merge operation,
    determine which section of the log structured hash table of the cached fingerprint index has not been committed to the persistent fingerprint index, and
    perform a recovery of the section.

17. The data storage system of claim 16, wherein the instructions are executable to:
  maintain indicators regarding which sections of the log structured hash table of the cached fingerprint index have been committed to the persistent fingerprint index, and which sections of the log structured hash table of the cached fingerprint index have not been committed to the persistent fingerprint index.

18. The data storage system of claim 17, wherein the indicators are stored in a non-volatile random access memory, and wherein the mirroring of the fingerprint index updates and the adding of the location information of the respective leaf blocks to the indirect block do not employ a B-tree cache index in the non-volatile random access memory.

19. The data storage system of claim 11, wherein the instructions are executable to:
  in response to the given incoming data value, determine whether the leaf block for the given incoming data value is in a volatile memory, and
  in response to determining that the leaf block for the given incoming data value is not in the volatile memory, access the indirect block to determine the location of the leaf block for the given incoming data value, and retrieve the leaf block for the given incoming data value from the cached fingerprint index into the volatile memory.

20. A method of a data storage system comprising a hardware processor, comprising:
  storing, in a persistent storage, a persistent fingerprint index comprising a log structured hash table;
  storing, in a persistent cache memory, a cached fingerprint index comprising a log structured hash table, wherein the log structured hash table of the cached fingerprint index comprises a series of leaf blocks containing fingerprint index entries in sorted order;
  computing fingerprints based on incoming data values for storing in the data storage system,
  producing fingerprint index updates based on the computed fingerprints;
  performing a merge operation to merge the fingerprint index updates to the persistent fingerprint index;
  as part of the merge operation, mirroring the fingerprint index updates to the cached fingerprint index, and adding, to an indirect block of the log structured hash table of the cached fingerprint index, location information of respective leaf blocks of the cached fingerprint index to which the fingerprint index updates have been added, wherein the location information specifies locations of the respective leaf blocks in the persistent cache memory;
  in response to a given incoming data value, accessing the indirect block to determine a location of a leaf block of the cached fingerprint index containing a fingerprint index entry for the given incoming data value; and
using the fingerprint index entry to perform data deduplication for the given incoming data value.

* * * * *